United States Patent [19]

Gardner

[11] 4,342,238

[45] Aug. 3, 1982

[54] AUTOMOTIVE DRIVE SYSTEM WITH CONTINUOUSLY VARIABLE TRANSMISSION

[75] Inventor: Derek Gardner, Hitchin, England

[73] Assignee: Borg-Warner Limited, Letchworth, England

[21] Appl. No.: 115,827

[22] Filed: Jan. 28, 1980

[30] Foreign Application Priority Data

Sep. 6, 1979 [GB] United Kingdom ............. 7931188

[51] Int. Cl.³ .................... F16H 37/00; F16H 37/08
[52] U.S. Cl. ...................................... 74/689; 74/701; 74/705; 74/740; 74/695
[58] Field of Search ............... 74/689, 701, 705, 695, 74/694, 730, 740, 788; 474/28, 242

[56] References Cited

U.S. PATENT DOCUMENTS

| | | | |
|---|---|---|---|
| 2,808,738 | 10/1957 | Bartell | 74/701 |
| 3,097,546 | 7/1963 | Kelbel et al. | 74/788 |
| 3,340,749 | 9/1967 | Magg et al. | 74/689 |
| 3,413,873 | 12/1968 | Bixby | 74/695 |
| 3,577,804 | 5/1971 | Ohno | 74/701 X |
| 3,720,113 | 3/1973 | Van Doorne et al. | 474/242 |
| 3,939,732 | 2/1976 | Giacosa | 74/740 X |
| 4,056,988 | 11/1977 | Kubo et al. | 74/740 X |
| 4,060,012 | 11/1977 | Giacosa | 74/689 |
| 4,094,203 | 6/1978 | Van Deursen et al. | 474/28 |

Primary Examiner—C. J. Husar
Assistant Examiner—Lawrence J. Gotts
Attorney, Agent, or Firm—Florian S. Gregorczyk

[57] ABSTRACT

An automotive drive system is disclosed including a continuously variable drive system including input and output pulleys and a belt intercoupling the pulleys, a hydrodynamic device, a forward-reverse gear set, a reduction gear set and a differential assembly where the elements are mounted along two axes. The hydrodynamic device, forward-reverse gear set and the input pulley of the continuously variable drive system are mounted along the first axis. The output pulley, the reduction gear set and the differential assembly are mounted along the second axis which is coaxial with the longitudinal axis of the axle shafts. The reduction gear set includes both a high-speed and a high-torque gear train, and the high-torque gear train is an integral element of the final drive differential. The hydrodynamic device includes a lock-up clutch for direct drive through the hydrodynamic device at operating road speeds.

3 Claims, 3 Drawing Figures

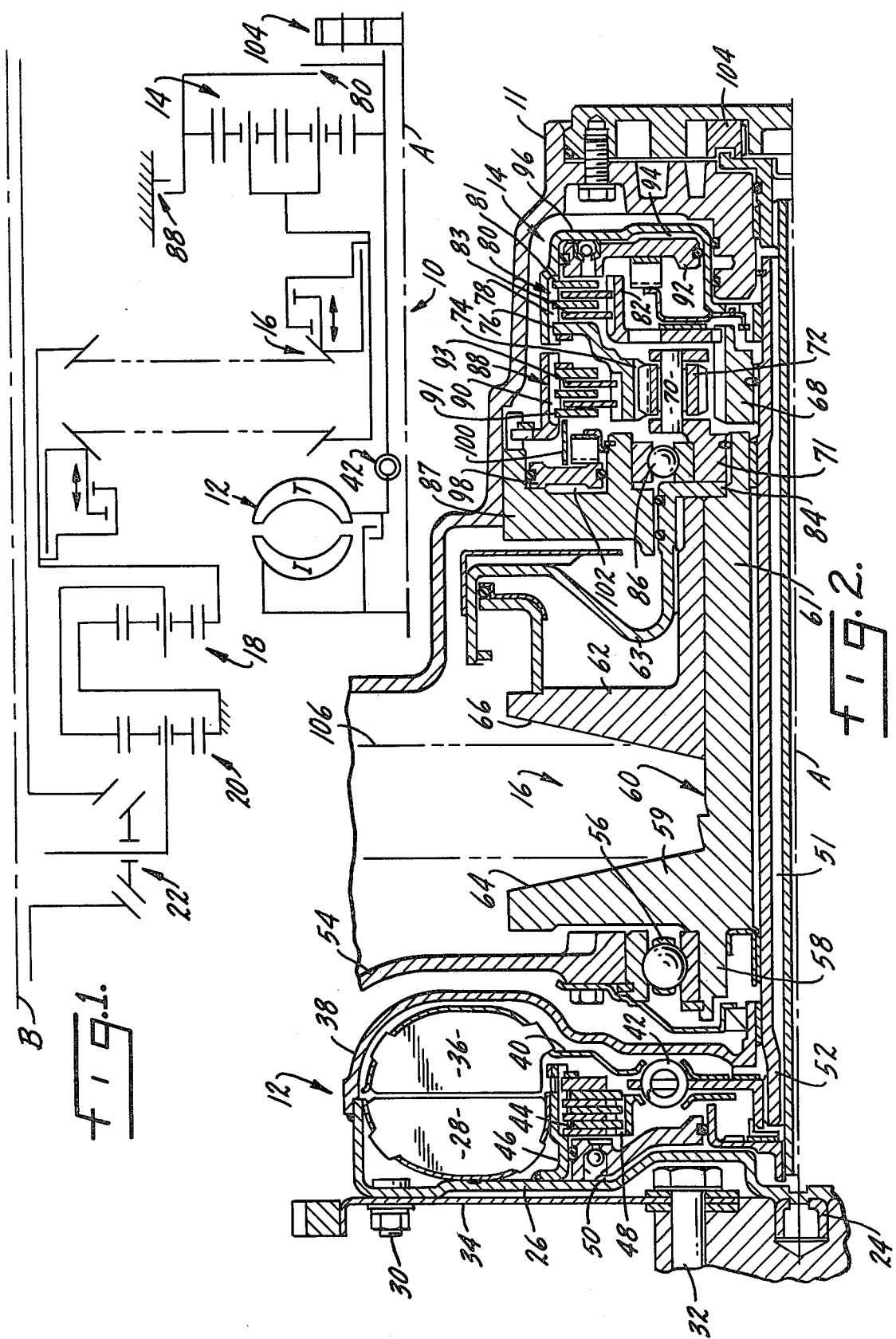

AUTOMOTIVE DRIVE SYSTEM WITH CONTINUOUSLY VARIABLE TRANSMISSION

BACKGROUND OF THE INVENTION

The present invention comprises a continuously variable transmission (CVT) mechanism. In general, automotive vehicles use manual or automatic transmissions for changing the drive ratio between the engine output shaft and the drive wheels. The transmission is "shifted" or changed in finite steps from start-up, when a high-torque, low speed drive is provided up to highway speeds, where a high-speed, low torque drive is provided. Shifting is accomplished by the driver displacing a shift lever to change the ratio in a manual transmission, or in an automatic transmission by the controlled release and engagement of friction elements. Because the shifting is in step functions, it is manifest that the most efficient operation (fuel consumption, engine efficiency, and so forth) can only be approximated with a transmission which changes gears in discrete steps. It is thus desirable to provide a continuously variable transmission where the gear ratio is varied in a regular, continuous manner, as the vehicle is started and accelerated to driving speeds.

The use of such a CVT employing variable-pitch pulleys in machine tools and similar variable speed systems has been known for some time. Recently considerable work has been directed to the improvement of such a continuously variable transmission to provide a practical component for an automotive drive train. One example of such a CVT is described and shown in U.S. Pat. No. 4,094,203—Van Deursen et al. This arrangement employs a steel belt to transfer drive between the relatively movable sheaves of a primary and secondary pulley. By controlling the sheave displacement—and thus the effective diameter—of each pulley, a considerable range of speed variation is attained in a continuous manner, without the step function change previously noted in connection with manual and automatic transmissions. Even with recent advances, such CVT transmissions for automotive use have still been difficult to manufacture, and imposed weight and volume requirements not unlike those of other transmissions.

It is, therefore, a primary object of the present invention to produce a continuously variable transmission mechanism suitable for automotive use which is simple to manufacture and of a practical size.

It is a more specific object of the invention to produce such a CVT mechanism in which all the drive and control components are mounted on only two axes to simplify manufacturing and installation.

SUMMARY OF THE INVENTION

A transmission mechanism constructed in accordance with this invention comprises a hydrodynamic device including impeller and turbine elements and adapted to be driven by a prime mover. A clutch is provided to lock the impeller and turbine elements together. A first shaft is connected to the turbine elements, and a planetary forward-reverse gear set is connected to the first shaft. A continuously variable drive system is provided, and includes an input pulley and an output pulley. An input pulley sleeve is connected to the forward-reverse gear set and to the input pulley; this sleeve is coaxial with the first shaft. A belt extends between the pulleys to transfer power from one pulley to the other. An output pulley sleeve is connected to the output pulley of the continuously variable drive system, and a reduction gear set is connected to this output pulley sleeve. A differential mechanism is connected to the reduction gear set, and an output drive means is connected to be driven by the differential mechanism. Thus the output drive means will be driven by the prime mover through the hydrodynamic device and the continuously variable drive system.

In accordance with an important aspect of the invention, the hydrodynamic device, first shaft, planetary gear set and input pulley all rotate about a first axis, and the output pulley, reduction gear set and differential mechanism all rotate about a second axis.

THE DRAWINGS

In the several figures of the drawings like reference numerals identify like components, and in those drawings:

FIG. 1 is a simplified diagram of a continuously variable transmission constructed in accordance with this invention; and FIGS. 2 and 3 together represent a cross-section of the transmission shown more generally in FIG. 1.

DETAILED DESCRIPTION OF THE INVENTION

Figure 3:
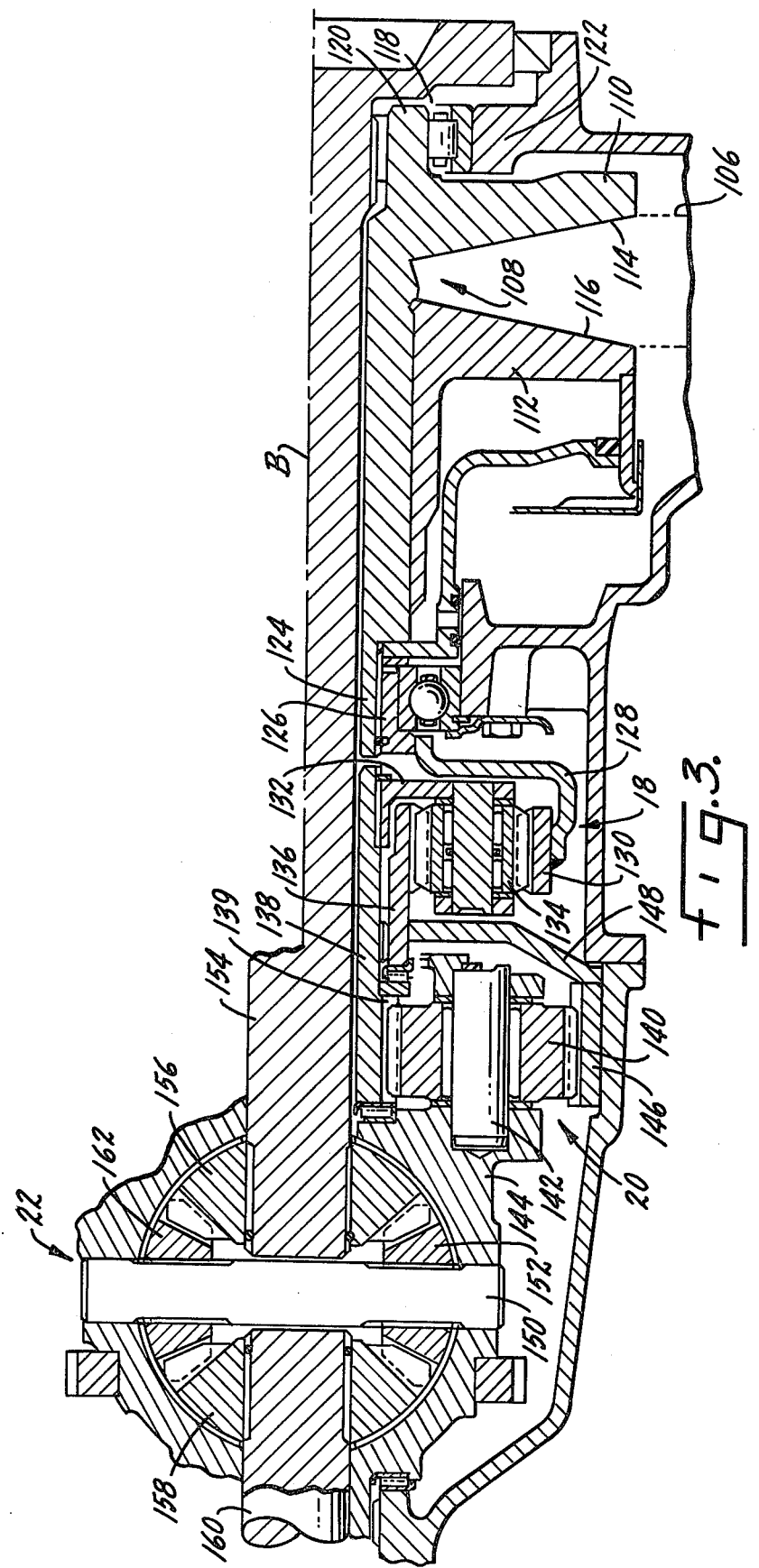

Referring to FIG. 1, there is shown a transmission mechanism 10 including a hydrodynamic device 12, a dual planetary forward-reverse gear set 14, a continuously variable pulley drive system 16, a high-speed planetary gear set 18, a high-torque planetary gear set 20 and a differential mechanism 22. The hydrodynamic device 12 and forward-reverse gear set 14 are on a first axis A, and the planetary gear sets 18, 20 and differential mechanism 22 are mounted on a second axis B parallel to first axis A.

Turning now to the detailed cross-sectional drawings, FIGS. 2 and 3, the transmission of the invention, enclosed in a pressed metal split casing 11, receives drive from an engine or other prime mover through drive plate 34 (FIG. 2). Pilot 24 is joined by welding or otherwise suitably affixed to a cover 26, which in turn is joined to an impeller 28 of hydrodynamic device 12. Cover 26 is also connected by bolt assemblies 30, 32 to drive plate 34. A turbine 36 is provided, and it is enclosed within a hydrodynamic device casing 38 to receive drive when impeller 28 is driven. Turbine 36 is connected to a plate 40 which comprises a part of a torsional damper 42.

Those skilled in the art will appreciate that, although hydrodynamic device 12 is depicted as a simple fluid coupling comprising impeller 28 and turbine 36, a torque converter or other hydrodynamic device can be substituted for the illustrated hydrodynamic device in a well-known manner.

A lock-up clutch means 44 is provided including a plurality of friction discs, some of which are connected by a member 46 to plate 26, and others of which are connected by a member 48 to torsional damper 42. A fluid channel 50 provides a path for fluid under pressure to effect engagement of the clutch means 44. A hollow intermediate or first shaft 52 is connected to the output side of torsional damper 42, and this shaft 52 also includes an interior channel 51. To the right of turbine 36 is a portion 54 of the transmission housing, and a bearing assembly 56 is interposed between the housing and an extension 58 of a fixed sheave 59 of an input pulley 60, which also includes a "movable" sheave 62 with a piston 63 having a flange 84. Fixed sheave 59 is provided with a face 64 and a sleeve means 61 connected to a pinion carrier 70.

It is apparent that pulley 60 rotates about first shaft 52, and thus the entire assembly is movable in the rotational sense about axis A. The term "fixed," as applied to sheave 59, indicates that this sheave of pulley 60 is fixed in its lateral position with respect to a second or movable sheave 62 which includes a face 66. Sheave 62 is "movable" in that it is displaceable laterally to the left and right along sheave 59, as viewed in FIG. 2, to provide a different effective radius of pulley 60 as the lateral distance between faces 64, 66 of the sheaves 59, 62 is adjusted.

As shown in the right-hand portion of FIG. 2, planetary gear set 14 includes a sun gear 68, splined to shaft 52, a pinion carrier 70 on which a plurality of pairs of pinion gears 72 are mounted, and a ring gear 74. In the illustrated embodiment, the pinion gears are dual, that is, between sun gear 68 and ring gear 74 are pairs of pinion gears meshing with each other, with one of the pinion gears engaging sun gear 68 and the other in meshing engagement with ring gear 74. Other types of gear sets can, of course, be substituted for this particular arrangement. Ring gear 74 is connected by a flange 76 to a member 78 of a forward clutch 80, which includes a plurality of friction discs 81. A second set of discs 83 of clutch 80 is coupled to another arm 82, which is splined to sun gear 68. It is thus apparent that, when forward clutch 80 is actuated, ring gear 74 is locked to sun gear 68, and drive is provided to carrier 70. Carrier 70 has a flange hub 71 connected to sleeve 61.

A bearing assembly 86 is provided between flange hub 71 and a housing member 87. A reverse brake 88 is provided, and includes a first side member 90 to which a plurality of friction discs 91 are secured. A second set of friction discs 93 are connected to arm 76, which in turn is secured to ring gear 74. Actuation of reverse brake 88 is effective to lock ring gear 74 and provide output drive from carrier 70 in a direction opposite that which is provided when forward clutch 80 is engaged.

A piston 92 is positioned to bring friction discs 81, 83 of forward clutch 80 into engagement as fluid is pumped into a fluid chamber 94 between piston 92 and clutch cylinder 96. A reverse piston 98 is positioned for movement to translate force through a tubular member 100 to bring friction discs 91, 93 of reverse brake 88 into contact when fluid is received in a chamber 102. Pump assembly 104 at the right end of FIG. 2 provides the necessary fluid under pressure for selective actuation of forward clutch 80, reverse brake 88, movable sheaves 62 and 112, lock-up clutch 44, also lubrication and ancillary fluid feeds.

A steel belt 106 is positioned such that its lower portion encircles the inner space of pulley 60 so that, as this pulley is driven, the driving force is transferred by belt 106 to an output pulley 108 shown in FIG. 3. Pulley 108 includes a fixed sheave 110 and a movable sheave 112. Fixed sheave 110 includes angular face 114, an extension 120 and a sleeve means 124. Movable sheave 112 includes an angular face 116. The angular faces 114, 116 of sheaves 110, 112 can be moved relatively closer or further apart as the movable sheave 112 is displaced laterally, as explained in the operative description of sheaves 59, 62 of pulley 60. Thus pulleys 60 and 108, with belt 106, together comprise a continuously variable drive system, as described generally in connection with FIG. 1.

The fluid pressure system for varying the effective diameters of the pulleys need not be detailed, as it can be any of several known types. One such arrangement is described in U.S. Pat. No. 4,094,203—Van Deursen et al.—which issued June 13, 1978. A journal bearing assembly 118 is interposed between extension 120 of fixed sheave 110 and a portion 122 of the transmission housing. Sleeve 124 of fixed sheave 110 is connected to a flange 126, which in turn is connected to the inner side of a flange 128.

Flange 128 is connected to a ring gear 130 of high-speed gear set 18. Gear sets 18, 20 can be considered in a broad sense as one reduction gear set. Gear set 18 also includes a planet carrier 132, the output element of gear set 18. Gear set 18 also includes a plurality of planet pinion gears 134, journalled on planet carrier 132 and meshing both with ring gear 130 and a sun gear 136. Planet carrier 132 is splined to a hollow shaft 138, which at its left end defines a plurality of teeth 139 in meshing engagement with a set of planet pinion gears 140 of high-torque gear train 20. Pinion gears 140 are journalled on shafts 142 of a planet carrier assembly 144.

Gear set 20 also includes a ring gear 146, grounded to the transmission housing as shown, and also connected by a fixed element 148 to sun gear 136 of high-speed gear set 18. Carrier 144 of high-torque gear train 20 is connected to drive a cross pin 150 of differential mechanism 22. Mounted on cross pin 150 are pinion gears 152, 162. Mounted on a first axle shaft or output drive means is a side gear 156. In the same way, a second side gear 158 is mounted on an axle shaft or output drive means 160. Side gears 158 and 156 are in meshing engagement with pinion gears 152, 162 whereby axle shafts 160 and 154 are driven as the center pin is rotated.

In operation, drive is supplied from the prime mover (not shown) to drive plate 34 and cover 26 to rotate impeller 28. As the fluid within coupling 12 is displaced, turbine 36 is rotated to provide drive through plate 40 and torsional damper 42 to rotate shaft 52. Later, when the transmission is brought up to road speed, lock-up clutch 44 can be actuated in a well-known manner to provide a direct connection between impeller 28 and turbine 36 to minimize losses in the drive train. Thus at this time shaft 52 is being driven, in turn rotating sun gear 68 of the forward-reverse gear set 14. However, there is no drive to input pulley 60 until either forward clutch 80 or reverse brake 88 is actuated. At this time, pump 104 is also being driven to supply the oil pressure for any of the actuations selected by the control system.

To drive the transmission in the forward direction, oil is supplied into chamber 94, displacing piston 92 and engaging forward clutch assembly 80. This effectively locks ring gear 74 to sun gear 72 in forward-reverse gear set 14, to drive planetary carrier 70 through flange hub 71 to pulley 60 of continuously variable drive system 16. Thus pulley 60 is rotated and by means of belt 106, pulley 108 is driven. Rotation of pulley 108 effectively drives hub 126 and flange 128 supplying drive to ring gear 130 of high-speed gear train 18. Accordingly, output of high-speed gear train 18 is taken by planet carrier 132, rotating shaft 138 which is connected to drive pinion gears 140 of high-torque gear train 20. Ring gear 146 of this gear set is grounded, and thus the output drive from the high-torque gear train 20 is passed through planet carrier 144 to center pin 150, driving the pinion gears and thus the side gears to pass drive to both the axle shafts.

To drive the transmission in the opposite direction, forward clutch 80 is released and fluid is admitted under pressure into chamber 102 to displace piston 98 to the right, engaging reverse brake 88. This in effect grounds ring gear 74 of the forward-reverse gear set, and drive from pinion carrier 70 is in a direction opposite to that just described when forward clutch 80 was engaged.

TECHNICAL ADVANTAGES

The disclosed transmission assembly is mounted along two axes to reduce the size of the assembly. The transmission assembly is enclosed in a pressed metal split casing to improve manufacture and reduce the weight of the assembly. Reduction in size and compactness is of prime importance where space is limited. In addition, assembly along only two axes simplifies the manufacture and assembly of these transmissions.

The forward clutch-reverse brake gear set offers a directional selection mechanism where the reverse brake assembly is "free running" until engaged, which increases the assembly gear life, reduces wear and gear noise, and increases power transfer efficiency. Although the pinion and side gears of the differential assembly are shown as bevel gears, they can also be of the spur gear type to simplify the manufacturing techniques. The hydrodynamic device is interposed for the following purposes: (1) a starting device; (2) a speed changer; (3) an engine speed-control device; (4) a retarding device; and (5) a shifting mechanism.

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

I claim:

1. A transmission mechanism comprising a hydrodynamic device adapted to be driven by a prime mover, said device including impeller and turbine elements, a clutch means adapted to lock said elements together, a first shaft connected to said turbine element, a planetary forward-reverse gear set connected to said first shaft, a continuously variable drive system having an input pulley, an output pulley, and a belt extending between said two pulleys to transfer power, each of said input and output pulleys having a fixed sheave and a movable sheave, means connecting the fixed sheave of the input pulley to said forward-reverse gear set, said input pulley being coaxial with said first shaft, a reduction gear set, means connecting the fixed sheave of the output pulley to the reduction gear set, a differential mechanism having an input shaft connected to the reduction gear set and a pair of side gears, and output drive means connected to the side gears of the differential mechanism, whereby said output drive means will be driven by the prime mover through said hydrodynamic device and said continuously variable drive system, wherein said hydrodynamic device, first shaft, planetary gear set, and input pulley rotate about a first axis, and said output pulley, reduction gear set and differential mechanism rotate about a second axis, and wherein said reduction gear set includes a high-speed planetary gear train and a high-torque planetary gear train, a separate sun gear for both gear trains, each gear train having an individual ring gear and pinion carriers having pinion gears mounted thereon, said output pulley fixed sheave being connected to the ring gear of the high-speed train to drive the planet pinion gears in the same direction engaging the sun gear at a reduced gear ratio through the high-speed train pinion carrier, said sun gear being connected to the high-torque train ring gear, a shaft connected to the pinion carrier of the high-speed gear train and the plurality of pinion gears of the high-torque gear train to drive the high-torque train pinion gears and the pinion carrier in the same direction to effect a second reduction in the gear ratio, where the pinion carrier for the high-torgue planetary gear train is an intergral segment of the differential mechanism.

2. A transmission mechanism as in claim 1, wherein said belt is a steel block belt.

3. A transmission mechanism as in claim 1, and further comprising a pressed metal split casing encasing the mechanism.

* * * * *

UNITED STATES PATENT AND TRADEMARK OFFICE
CERTIFICATE OF CORRECTION

PATENT NO. : 4,342,238
DATED : August 3, 1982
INVENTOR(S) : DEREK GARDNER

It is certified that error appears in the above—identified patent and that said Letters Patent is hereby corrected as shown below:

Column 6, line 37, cancel "high-torgue" and insert -- high-torque --.

Column 6, line 37, cancel "intergral" and insert -- integral --.

Signed and Sealed this

Nineteenth Day of October 1982

[SEAL]

Attest:

GERALD J. MOSSINGHOFF

Attesting Officer    Commissioner of Patents and Trademarks